United States Patent [19]

Clark

[11] 4,077,642
[45] Mar. 7, 1978

[54] MOVABLE BED TRAILER
[75] Inventor: Bobby Dean Clark, Shoshoni, Wyo.
[73] Assignee: Chair-E-Yacht, Inc., Shoshoni, Wyo.
[21] Appl. No.: 651,196
[22] Filed: Jan. 21, 1976
[51] Int. Cl.² .......................................... B62D 33/08
[52] U.S. Cl. ............................... 280/43.2; 280/43.23
[58] Field of Search ................. 280/43.2, 43.24, 43.23, 280/43.18, 43.17; 214/390, 512

[56] References Cited
U.S. PATENT DOCUMENTS

| | | | |
|---|---|---|---|
| 2,480,909 | 9/1949 | Davis | 280/43.2 |
| 2,822,944 | 2/1958 | Blomgren | 214/390 |
| 2,885,216 | 5/1959 | Browning | 280/43.24 |
| 2,905,481 | 9/1959 | Schramm | 280/43.18 |
| 3,051,504 | 8/1962 | Bruvold | 280/43.18 |
| 3,056,610 | 10/1962 | Massey | 280/43.18 |
| 3,112,122 | 11/1963 | Warr et al. | 280/43.2 |
| 3,180,510 | 4/1965 | Moller | 214/506 |
| 3,271,042 | 9/1966 | Flodin | 280/43.23 |
| 3,315,974 | 4/1967 | Weaver et al. | 280/43.2 |

Primary Examiner—Joseph F. Peters, Jr.
Assistant Examiner—Michael J. Forman
Attorney, Agent, or Firm—Bernard L. Kleinke

[57] ABSTRACT

A movable bed trailer includes a U-shaped frame mounted on a pair of oppositely-disposed wheels and is adapted to be pulled behind a vehicle. A load bed is vertically movably supported by the frame by means, in one embodiment of the invention, of oppositely-disposed pairs of links on opposite sides of the load bed for swingably connecting the bed to the frame to support the bed in substantially the same plane as the frame during movement of the vehicle and to lower the bed relative to the frame to rest on the ground for loading and unloading purposes. A drive mechanism is mounted on the frame to raise the bed by causing it to swing upwardly while enabling the bed to remain in a substantially horizontal disposition. The drive mechanism also permits the bed to swing downwardly under the force of gravity to rest on the ground.

10 Claims, 3 Drawing Figures

U.S. Patent      March 7, 1978      4,077,642
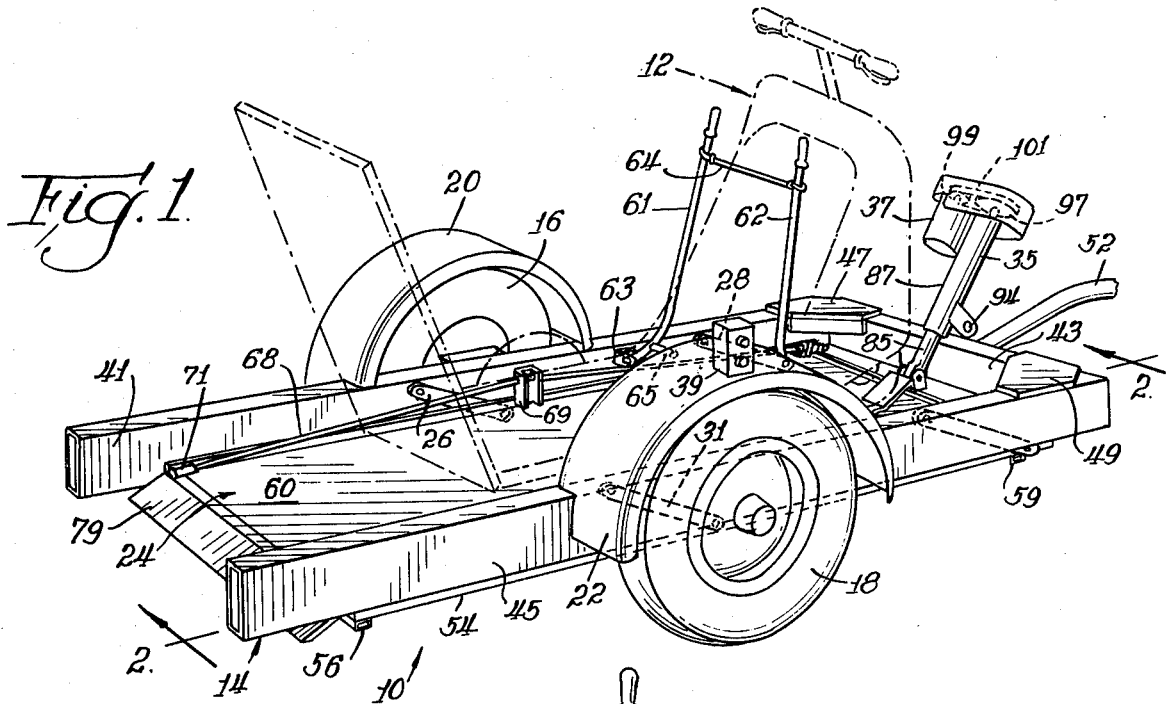
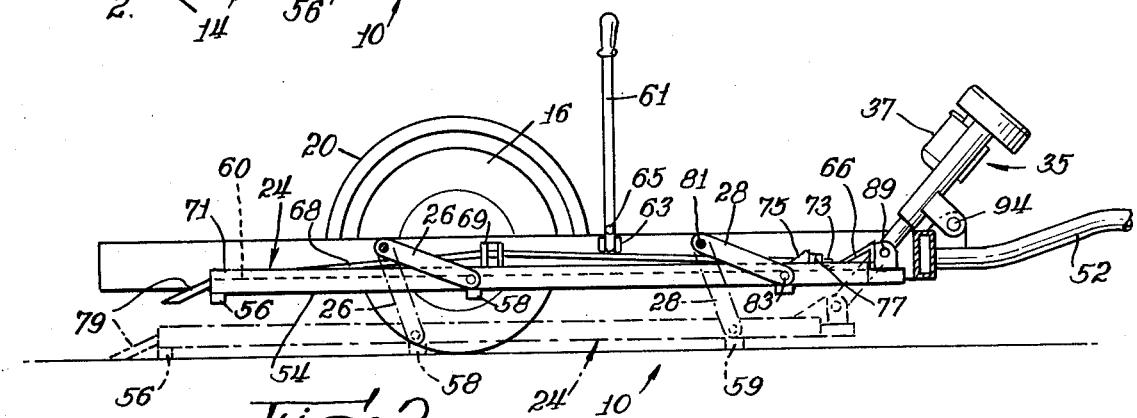
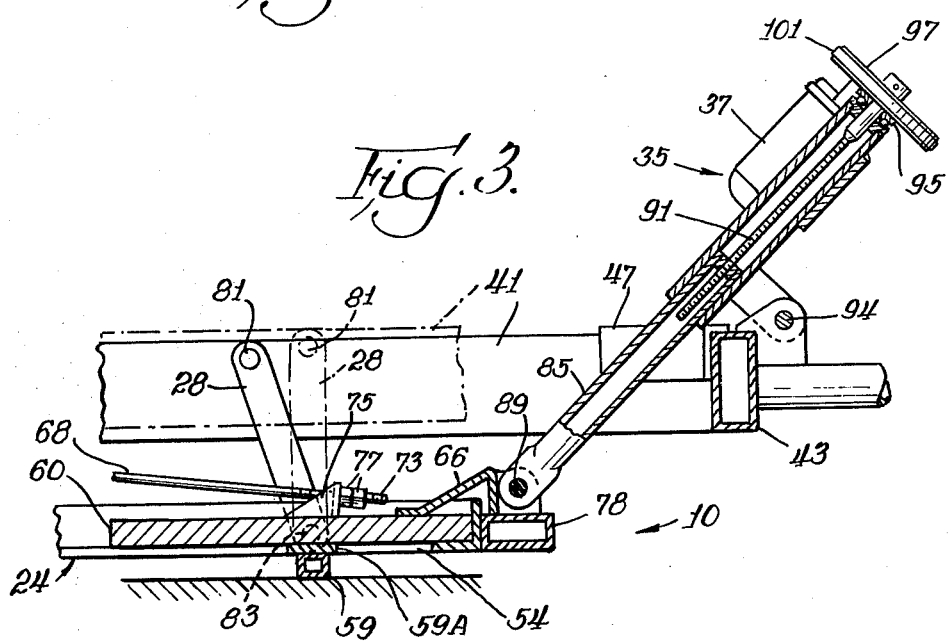

MOVABLE BED TRAILER

The present invention relates in general to a movable bed trailer, and it more particularly relates to a trailer having a load bed which is movable between an upper position used during movement of the vehicle and a lower position resting on the ground for loading or unloading purposes.

Movable bed trailers have been employed to tow small vehicles, such as a snowmobile, golf cart or the like, behind a larger vehicle. In this regard, reference may be made to the following U.S. Pat. which disclose such trailers and the like: Nos. 2,480,909; 2,905,481; 3,051,504; 3,056,610; 3,271,042 and 3,361,440. While the heretofore known movable bed trailers and the like might well be suitable for some applications, it would be highly desirable to have one which is simplified in design and which is extremely reliable and versatile in operation. Also, such a trailer should maintain its load bed in a substantially horizontal plane during raising and lowering of it so as to more readily and conveniently load and unload a vehicle therefrom. Such a trailer should be relatively inexpensive to manufacture.

The object of this invention is to provide a new and improved movable bed trailer, which may be raised and lowered relative to its frame and remain at all times in a substantially horizontal disposition, and which is greatly simplified in construction and is efficient in operation and convenient to use.

Briefly, the above and further objects of the present invention are realized by providing a trailer having a frame rollably supported at its opposite sides by a pair of wheels, and a load bed movably mounted on the frame and adapted to be raised and lowered under the control of a drive mechanism mounted on the frame. The drive mechanism permits the bed to swing downwardly to a ground level position and swings the bed upwardly to a travel or use position at an upper level. In one embodiment of the present invention, the load bed is swingably mounted to the frame by links pivotally secured to opposite sides of the load bed. Each link is pivotally connected at one of its ends to the frame and is connected at its opposite end in a pivotal manner to the load bed. In one embodiment, the drive mechanism includes a pair of telescoping tubes which extend to permit the load bed to fall under the force of gravity to ground level and which thereafter retract to swing the load bed upwardly into its upper traveling or use position.

The above, and still further highly important objects and advantages of the invention will become apparent from the following detailed specification, appended claims, and attached drawings, wherein:

FIG. 1 is a pictorial view of the trailer which is constructed in accordance with the present invention and which is illustrated showing a smaller vehicle in dotted lines being carried thereby;

FIG. 2 is a cross-sectional view of the trailer of FIG. 1 taken substantially along the line 2—2 thereof; and FIG. 3 is a fragmentary enlarged cross-sectional view similar to the view of FIG. 2, illustrating the load bed in its lower position.

Referring now to the drawings, and more particularly to FIG. 1 thereof, there is shown a trailer 10 which is adapted to be pulled behind a larger vehicle (not shown) and which is able to transport loads, such as the selfpropelled three-wheel vehicle 12 (shown in broken lines) for handicapped persons as described in greater detail in U.S. Pat. No. 3,921,740. However, it is to be understood that many different types and kinds of loads may be transported with the trailer 10, such loads might well include snowmobiles, weights or the like. The trailer 10 is of the movable bed type, and it includes a U-shaped frame 14 rollably supported above the ground by a pair of wheels 16 and 18 journaled for rotation on opposite sides thereof. A pair of fenders 20 and 22 are mounted on the frame 14 over the wheels 16 and 18. A load bed generally indicated at 24 is vertically movably mounted on the frame 14 by means of a pair of links 26 and 28 on the left side of the trailer and a similar pair of links 31 and 33 on the right side of the trailer. A raising and lowering device 35 includes a driving means in the form of a reversing motor 37 for lowering the bed 24 relative to the frame to ground level for loading and unloading purposes and alternatively for raising the bed up into substantially the same plane as the frame 14 for transporting the load. A control box 39 mounted on the fender 22 is used by the operator to cause the reversing motor to move in either one of its two directions for raising or lowering the bed 24 as hereinafter described in greater detail. The motor 37 is energized by a battery (not shown) which may either be an auxiliary battery carried by the vehicle 10 or a vehicle battery of the vehicle pulling the trailer 10.

Considering now the frame 14 in greater detail with reference to FIGS. 1, 2 and 3 of the drawings, the frame 14 is formed by three channels 41, 43 and 45. A pair of reinforcing corner gussets 47 and 49 are mounted respectively between the channels 41 and 43 and the channels 43 and 45. A hitching rod 52 is fixed by any suitable technique, such as by welding (not shown), to the channel 43, the opposite end (not shown) of the rod 52 being adapted to be connected in a conventional manner to the rear end of the pulling vehicle.

Considering now in greater detail the load bed 24 with reference to the drawings, the bed 24 includes a rectangular angle-iron frame 54 having as best seen in FIG. 2 a series of reinforcing bars 56, 58 and 59 extending transversely across the load bed 24. Each one of the bars is fixed to a transverse strip, such as the strip 59A for the bar 59, which in turn extends across the angle-iron frame 54 and is secured thereto by any convenient technique, such as by welding. The rigid floor or sheet 60 rests on and is supported by the frame 54, the floor or sheet 60 being composed of any suitable rigid material such as plywood.

A pair of clamp arms 61 and 62 pivotally attached, such as at 63 for the clamp arm 61 (FIG. 2), are adapted to pivot inwardly from their upstanding position on opposite sides of the vehicle supported on top of the load bed 24, a strap 64 (FIG. 1) releasably securing the handles of the clamps 61 and 62 together for retaining the vehicle or other such load in place on the load bed 24 for transportation purposes. Each one of the clamp arms 61 and 62 includes a stub finger, such as the stub finger 65 of the clamp arm 61 as shown in FIGS. 1 and 2 of the drawings, for extending over the platform of the vehicle 12 for securing it in position. A stop plate 66 is mounted on the front end portion of the load bed 24 at the center portion thereof for preventing the third wheel of the vehicle 28 from rolling forwardly.

For heavier loads, a pair of thrust brace rods, such as the thrust brace rod 68, extend longitudinally at the opposite sides of the load bed 24. The thrust brace rods are adapted to be suitably tensioned for tensioning longitudinally the load bed 24. In this regard, since the two brace rods are similar to one another, only the brace rod 68 will now be described in detail. The brace rod 68 extends through and is supported by an intermediate bracket 69 at the central portion of the side edge of the load bed 24 for bowing vertically the thrust brace rod 68. The rear end portion of the rod 68 is welded to the angle-iron frame 54 to fix the rear end portion of the rod 68 in position, and the front end portion of the rod 68 is movably fixed to the angle-iron frame 54 to enable the rod 68 to be tensioned for heavier loads. In this regard, the threaded front end 73 extends through an upstanding bracket 75 fixed to the angle-iron frame 54 with a pair of nuts 77 threaded onto the end 73 against the bracket 75 for maintaining the rod 68 under tension.

A transversely-extending front channel 78 is secured to the front portion of the rectangular angle-iron frame 54 for connection to the raising and lowering device 35 as explained hereinafter in greater detail. As shown in FIGS. 1 and 2 of the drawings, a tail ramp 79 is fixed to the floor or sheet 60 to facilitate moving a vehicle or other load up onto the load bed 24.

Considering now the links in greater detail with reference to the drawings, since the links are all similar to one another only the link 28 will now be considered in detail. The link 28 is pivotally connected at its upper end at 81 to the left hand channel 41 of the frame 14. The lower end of the link 28 is pivotally connected at 83 to the angle-iron frame 54 of the load bed 24. Each one of the links extends downwardly at an angle from its upper pivotal connection to the U-shaped frame 14.

It should be understood that while two pairs of links are shown on each side of the trailer 10 for supporting the load bed 24, any suitable number of links such as three or four or more may be connected on each side of the load bed depending upon the size and other factors of the trailer as is well known to those skilled in the art.

Referring now to FIG. 3, the raising and lowering device 35 will now be considered in greater detail. The device 35 includes an inner tube 85 which is telescopically inserted into an outer tube 87 to form a mechanism driven by the driving means or motor 37 to move extensively toward and alternatively away from the load bed 24 for lowering and raising it. The distal end portion of the inner tube 85 is pivotally connected at 89 to the front channel 78 of the load bed 24 as best seen in FIG. 3. A threaded rod 91 extends co-axially within the inner and outer tubes for providing the necessary movement between the tubes, and for this purpose, the threaded rod 91 extends through a nut 93 fixed at the outer opposite end of the inner tube 85.

In order to pivotally support the raising and lowering device 35 on the U-shaped frame 14, the outer tube 87 is pivotally connected at 94 to the frame 14. The entire device 35 is mounted pivotally on the U-shaped frame 14 at the central portion of the transverse channel 43 of the frame 14, and the mechanism, including the telescoping tubes, extend from the motor 37 downwardly over the channel 43 and the inner tube 85 is pivotally connected to the central portion of the front channel 78 of the load bed 24.

A thrust bearing 95 surrounds the upper end portion of the threaded rod 91 at the upper end of the outer tube 87. A large pulley 97 is fixed to the outer end of the threaded rod 91 extending outwardly from the outer tube 87 and the thrust bearing 95, and a smaller pulley 99 (FIG. 1) is fixed to the output shaft of the motor 37 to drive the larger pulley 97 by means of a belt 101 (FIGS. 1 and 3).

OPERATION

In operation, briefly, in order to lower the load bed 24 from the traveling position as indicated in FIG. 1 to the loading and unloading position as shown in broken lines in FIG. 2 and in solid lines in FIG. 3, the control box 39 is operated to turn on the motor 37 in the proper direction to cause the pulleys 97 and 99 with their belt 101 to drive the threaded rod 91. As a result, the inner tube 85 moves extensively to permit the load bed 24 to fall under the force of gravity until its reinforcing bars rest on the ground as best seen in FIG. 3. In so doing, the links, such as the link 28, pivots about its upper pivot point 81 on the U-shaped frame 14 to permit the load bed 24 to be lowered to the ground. The links all swing backwardly to a position as indicated in FIG. 3, which position is almost upright but slopes downwardly from the upper pivot point to the lower pivot point.

After driving the vehicle 12 up onto the load bed 24 as indicated in broken lines in FIG. 1, the clamp arm 61 and 62 are pivoted laterally toward one another until their stub fingers are disposed over the floor of the vehicle 12 and the clamping arm 61 and 62 engage the vehicle 12. The strap 64 then secures the clamp arm 61 and 62 together for securing the vehicle 12 in position. The control box 39 may then be operated to cause the motor 37 to operate in its reverse direction to raise the load bed 24. Thus, the threaded rod 91 is driven in an opposite direction to cause the nut 93 and the inner tube 85 fixed thereto to move upwardly within the upper outer tube 87 thereby moving the load bed 24 upwardly. The links pivot about their upper pivot points in an opposite counter clockwise direction as viewed in FIG. 3 to cause the links to return to their positions as shown in FIGS. 1 and 2 of the drawings. The motor is then turned off when the bed 24 is moved upwardly to a position substantially within the same plane as the U-shaped frame as best seen in FIG. 2 of the drawings.

According to the invention, another advantage of the versatile trailer 10 is that where it becomes necessary to repair or replace the wheels 16 and 18, the wheels may be raised up off of the ground by the raising and lowering device 35 together with the links. With reference to FIG. 3 of the drawings, after lowering the load bed 24 to the ground as shown in solid lines, the control box 39 is continued to be operated for the continued operation of the motor 37. As a result, the inner tube 87 continues to move extensively outwardly from the outer tube 87 so that the links, such as the link 28, pivots about its lower pivot point 83 in a clockwise direction to pull the U-shaped frame 14 upwardly and forwardly until the links are substantially vertical in disposition. As a result, the wheels 16 and 18 connected to the U-shaped frame 14 are raised with the frame so that the wheels are then off of the ground. The wheels 16 and 18 include pneumatic tires which may be repaired or replaced in a convenient manner.

It is to be understood that the form of the present invention as shown and described herein is to be taken as a preferred embodiment of the present invention and that various changes and modifications relative to the shape, size, material and arrangement of the various different parts may be resorted to without departing from the true spirit and scope of the present invention. Accordingly, it is intended that the invention be limited only by the true spirit and scope of the appended claims.

What is claimed is:

1. A trailer comprising:

a frame;

wheel means journaled for rotation on opposite sides of said frame for rollably supporting it along the ground;

a load bed movably mounted on said frame;

link means movably connecting said bed to said frame for enabling the bed to be raised and lowered relative to said frame in a substantially horizonatal disposition during the raising and lowering of said bed;

driving means mounted on said frame for controlling the raising and lowering of said bed relative to said frame;

a mechanism driven by said driving means for moving extensively toward said bed and alternatively for retracting therefrom toward said frame, said mechanism having a distal end portion connected to said bed;

mounting means for attaching pivotally said mechanism to said frame;

connecting means for attaching pivotally said distal end portion of said mechanism to said bed; and said link means includes a plurality of single links; each one of said links being pivotally connected at one of its ends to said frame and at its opposite end to said load bed, each one of said links extending forwardly and downwardly from said frame to said bed when said bed is raised, each one of said links extending forwardly and downwardly at almost a vertical disposition when said bed is lowered to ground level, said links being movable pivotally further in the same direction as their bed-lowering direction after said bed rests at ground level and said mechanism pivoting to enable said driving means and said mechanism to move said frame upwardly relative to said bed to raise said wheel means above ground level.

2. A trailer according to claim 1, wherein each one of said links is connected pivotally to the inside of the frame and to a side edge of said load bed.

3. A trailer according to claim 1, wherein said mechanism includes a pair of telescoping tubes for moving extensively relative to one another in response to said driving means.

4. A trailer according to claim 3, wherein said mechanism includes a threaded rod driven by said driving means and extending co-axially within said tubes, a nut being fixed to one of said tubes and threadably surrounding said threaded rod.

5. A trailer according to claim 4, wherein said driving means includes a reversing motor, a pulley and belt arrangement drivingly connecting the output of the motor to said threaded rod.

6. A trailer according to claim 1, wherein said frame is U-shaped, said load bed being substantially flat, at least one thrust brace rod extending longitudinally along said load bed and being bowed about its mid point, said rod being adjustably tensionable to tend to bow said load bed.

7. The method of operating a trailer of the type having wheel means journaled for rotation on opposite sides of frame means for supporting it rollably along the ground and having a load bed movably mounted on said frame means by a plurality of links to enable the bed to be raised and lowered relative to the ground, each one of said links being pivotally connected at one of its ends to said frame means and at its opposite end to the bed, driving means being provided for actuating a mechanism pivotally mounted on said frame means and pivotally connected to the bed for moving extensively toward and away from said frame means to raise and lower the bed, comprising:

causing said drive means to move said mechanism extensively for lowering the bed to the ground until the bed rests on the ground;

continuing to cause said drive means to move said mechanism extensively for raising said frame means relative to the bed for raising said wheel means above ground level;

subsequently causing said drive means to retract said mechanism for lowering the frame until said wheel means rest on the ground; and continuing to cause said drive means to retract said mechanism for raising the bed upwardly toward said frame means.

8. The method according to claim 7 wherein during the initial step of causing said drive means to move said mechanism extensively, causing the links to swing backwardly as the bed is being lowered until the bed rests on the ground, at which point the links extend at almost a vertical disposition.

9. The method according to claim 8, wherein during the second step of continuing to cause said drive means to move said mechanism extensively, causing said links to move pivotally from said point further backwardly after the bed rests on the ground, causing the mechanism to move pivotally to enable said driving means and the mechanism to move said frame means upwardly relative to the bed to raise said wheel means above ground level.

10. The method according to claim 9, during the third step of subsequently causing said drive means to retract said mechanism, causing said links to move pivotally forwardly until said wheel means rest on the ground, during the final step of continuing to cause said drive means to retract said mechanism continuing to move the links forwardly to raise the bed upwardly.

* * * * *